Nov. 24, 1925.  
M. DE GRAAF  
1,562,691  
CAP FOR AUTOMOBILE RADIATORS  
Filed Aug. 18, 1923
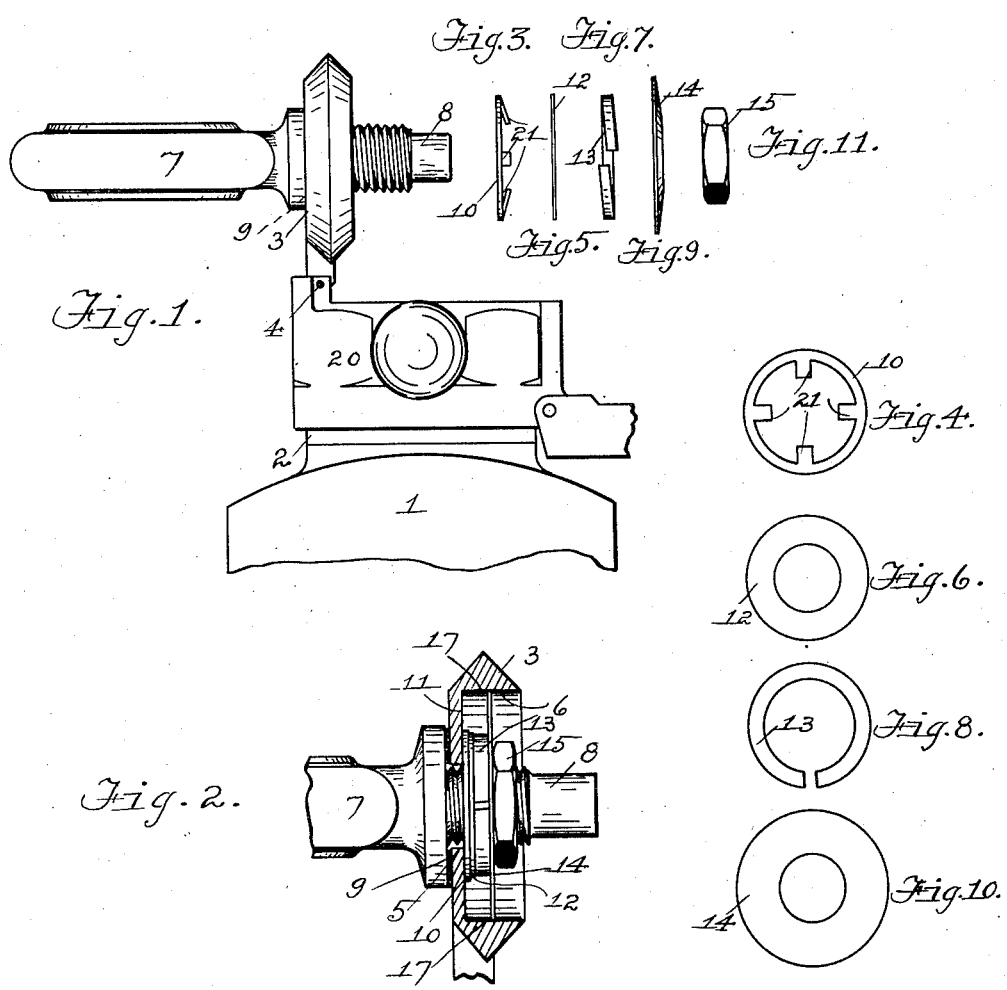
Witness:  
Geo. L. Chapel
Inventor:  
Martin De Graaf.  
by Cyrus W. Rice  
Attorney.

Patented Nov. 24, 1925.

1,562,691

UNITED STATES PATENT OFFICE.

MARTIN DE GRAAF, OF GRAND RAPIDS, MICHIGAN, ASSIGNOR, BY MESNE ASSIGNMENTS, TO WOLVERINE METAL SPECIALTIES CO., OF GRAND RAPIDS, MICHIGAN, A CORPORATION OF MICHIGAN.

CAP FOR AUTOMOBILE RADIATORS.

Application filed August 18, 1923. Serial No. 658,023.

*To all whom it may concern:*

Be it known that I, MARTIN DE GRAAF, a citizen of the United States, residing at Grand Rapids, in the county of Kent and State of Michigan, have invented new and useful Improvements in Caps for Automobile Radiators, of which the following is a specification.

The present invention relates to caps for automobile radiators; and its object is to provide a device of that character having improved means for preventing the removal of the thermometer-carrying member of such caps.

This and any other objects hereinafter appearing are attained by, and the invention finds preferable embodiment in, the structure hereinafter particularly described in the body of this specification and illustrated by the accompanying drawings, in which:

Figure 1 is a side view of the upper portion of a radiator for an automobile, with my cap therefor attached thereto;

Figure 2 is a central vertical sectional view of the cover thereof showing parts carried thereby;

Figure 3 is an edgewise view of a washer having inwardly-radially extending arms;

Figure 4 is a face view thereof;

Figure 5 is an edgewise view of a washer of usual form;

Figure 6 is a face view of the same;

Figure 7 is an edgewise view of a split helically-formed washer;

Figure 8 is a face view thereof;

Figure 9 is an edgewise view of a concavo-convex washer;

Figure 10 is a face view of the same; and

Figure 11 is an edgewise view of a nut adapted to secure these washers in assembled position.

In the drawings, a radiator 1, containing water for cooling the engine of an automobile, has a hollow upwardly-extending neck 2 through which water is poured to fill the radiator. The hollow cylindrical body 20 of the cap is secured to this neck, and a cover 3 is secured to said body as by being mounted at 4 thereon turnably to open position, shown in Figure 1, and to closed position. This cover has an opening therethrough with a contracted portion 5 and an enlarged portion 6 as seen in Figure 2. A member 7 adapted to carry a thermometer (commonly called a "moto-meter") has a screw-threaded shank 8 extending through said opening and a shoulder 9 abutting the outer side of the cover. This member 7 is held on the cover securely against removal by the following means: a washer 10 having inwardly-radially-extending arms 21 inclined relatively to its sides, is passed over the inner end of the shank 8 and rests on the bottom 11 of the enlarged portion of said opening; the following washers are thereupon and in the following order passed over the inner end of the shank, viz: the ordinary flat washer 12, the split helically-formed washer 13, and the concavo-convex washer 14; whereupon the nut 15 is screwed down on the threads of the shank until the arms 21 of the washer 10 are flattened and thereby pressed into holding contact with the threads of the shank, and the washer 14 is flattened and thereby pressed into holding edgewise contact with the lateral wall 17 of the enlarged portion of said opening, and the washer 13 is flattened. These washers now assume the position seen in Figure 2, being thus flattened between the bottom 11 of said enlarged portion of the opening and the nut 15 by the screwing down of the nut.

It will be seen that the arms 21 of the washer 10 by engaging, when flattened, the threads of the shank, assist in holding the shank from unscrewing out of the nut, and that the flattening of the washer 14 whereby its edge tightly contacts the inner surface of the wall 17 also assists, as well as prevents water and dirt from entering beneath the washer 14.

I claim:

1. In a structure of the character described; a body having an opening with a contracted portion and an enlarged portion; a member having a screw-threaded shank extending through said opening and a shoulder abutting the outer side of the body; a concavo-convex washer on said shank; a nut on the shank outside the washer and adapted in screwed-down position to flatten the washer between the nut and the bottom of the enlarged portion of said opening and thereby press the washer into holding edgewise contact with the lateral wall of said portion.

2. In a structure of the character described; a body having an opening with a contracted portion and enlarged portion; a member having a screw-threaded shank extending through said opening and a shoulder abutting the outer side of the body; a normally concavo-convex washer on said shank; a second washer on said shank having a plurality of inwardly-radially extending arms inclined relatively to its sides; a nut on the shank outside the washers and adapted in screwed-down position to flatten the first-mentioned washer between the nut and the bottom of the enlarged portion of said opening and thereby press said washer into holding edgewise contact with the lateral wall of said portion, and also to flatten the arms of the second-mentioned washer between the nut and the bottom of the enlarged portion of said opening and thereby press the arms into holding contact with the threads of the shank.

3. In a structure of the character described; a body having an opening with a contracted portion and an enlarged portion; a member having a screw-threaded shank extending through said opening and a shoulder abutting the outer side of the body; a concavo-convex washer and a split helically formed washer on said shank; a nut on the shank outside the washers and adapted in screwed-down position to flatten them between the nut and the bottom of the enlarged portion of said opening and thereby press the first-mentioned washer into holding edgewise contact with the lateral wall of said portion.

In testimony whereof I have hereunto set my hand at Grand Rapids, Michigan, this 1st day of August, 1923.

MARTIN DE GRAAF.